(12) United States Patent
Tourrilhes et al.

(10) Patent No.: US 11,943,129 B2
(45) Date of Patent: *Mar. 26, 2024

(54) AVAILABLE NETWORK BANDWIDTH ESTIMATION USING A ONE-WAY-DELAY NOISE FILTER WITH BUMP DETECTION

(71) Applicant: HEWLETT PACKARD ENTERPRISE DEVELOPMENT LP, Houston, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 360 days.

This patent is subject to a terminal disclaimer.

(21) Appl. No.: 17/282,838

(22) PCT Filed: Nov. 1, 2018

(86) PCT No.: PCT/US2018/058794
§ 371 (c)(1),
(2) Date: Apr. 5, 2021

(87) PCT Pub. No.: WO2020/091798
PCT Pub. Date: May 7, 2020

(65) Prior Publication Data
US 2021/0352001 A1   Nov. 11, 2021

(51) Int. Cl.
*H04L 43/12* (2022.01)
*H04L 43/0876* (2022.01)
*H04L 43/16* (2022.01)

(52) U.S. Cl.
CPC .......... *H04L 43/12* (2013.01); *H04L 43/0876* (2013.01); *H04L 43/16* (2013.01)

(58) Field of Classification Search
CPC ...... H04L 43/12; H04L 43/0876; H04L 43/16
See application file for complete search history.

(56) References Cited

U.S. PATENT DOCUMENTS 9,503,384 B1   11/2016   Oliveira et al.
11,153,192 B2  10/2021   Tourrilhes et al.
(Continued)

FOREIGN PATENT DOCUMENTS

WO   WO-2014030072 A2   2/2014

OTHER PUBLICATIONS

Marshall, C., "What is SD-WAN and What Can It Do for my Network?" LookingPoint, 2016, https://www.lookingpoint.com/blog/what-is-sd-wan-and-what-can-it-do-for-my-network.
(Continued)

*Primary Examiner* — Basil Ma
(74) *Attorney, Agent, or Firm* — Hewlett Packard Enterprise Patent Department

(57) ABSTRACT

Systems and methods are provided for available network bandwidth estimation using a one-way-delay noise filter with bump detection. The method includes receiving one-way delay measurements for each probe packet in a probe train sent over the telecommunications path; grouping the probe packets into a plurality of pairs based on the one-way delay measurements; for each pair, computing a respective noise threshold based on the one-way delay measurements of all the probe packets transmitted after a later-transmitted probe packet of the pair; selecting one of the pairs according to the noise thresholds and the one-way delay measurements for the probe packets of the pairs; and estimating the available bandwidth on the telecommunications path based on transmission times of the probe packets in the selected pair.

20 Claims, 6 Drawing Sheets

(56) References Cited

U.S. PATENT DOCUMENTS

| | | | |
|---|---|---|---|
| 2006/0182039 A1 | 8/2006 | Jourdain et al. | |
| 2007/0217448 A1 | 9/2007 | Luo et al. | |
| 2011/0149751 A1 | 6/2011 | Li et al. | |
| 2013/0016620 A1* | 1/2013 | Den Hartog | H04L 43/0882 370/252 |
| 2014/0112148 A1* | 4/2014 | Flinta | H04L 43/10 370/235.1 |
| 2015/0146560 A1* | 5/2015 | Johnsson | H04L 43/0882 370/252 |
| 2015/0281028 A1 | 10/2015 | Akhter et al. | |
| 2015/0333993 A1* | 11/2015 | Welin | H04W 24/08 370/252 |
| 2017/0324635 A1 | 11/2017 | Oshiba | |

OTHER PUBLICATIONS

Prasad, R. S. et al., "Bandwidth Estimation: Metrics, Measurement Techniques, and Tools," IEEE Network, 2003, pp. 27-35, https://www.cc.gatech.edu/fac/Constantinos.Dovrolis/Papers/NetDov0248.pdf.

Varela et al., "RMS Delay and Coherence Bandwidth Measurements in Indoor Radio Channels in the UHF Band", IEEE Transactions on Vehicular Technology, vol. 50, No. 2, Mar. 2001, pp. 515-525.

Lin et al., "A novel hybrid probing technique for end-to-end available bandwidth estimation," IEEE Local Computer Network Conference, Denver, CO, USA, 2010, pp. 400-407.

Matt Mathis, "TReno Bulk Transfer Capacity," Feb. 1999, Network Working Group, Internet-Draft, 7 pages.

Ribeiro et al., "PathChirp: Efficient Available Bandwidth Estimation for Network Paths", in Proceedings of 4th passive active measurement workshop, 2003, pp. 1-11.

Ribeiro, V., et al. "Pathchirp: A light-weight available bandwidth estimation tool for network-aware applications." Proceedings of 2003 LACSI Symposium. New Mexico: LACSI Press, 2003, pp. 1-12.

Strauss et al., "A Measurement Study of Available Bandwidth Estimation Tools," IMC'03, Oct. 27-29, 2003, pp. 39-44.

Wikipedia, "TCP congestion control", available online at <https://en.wikipedia.org/w/index.php?title=TCP_congestion_control&oldid=1051487581>, Oct. 23, 2021, 15 pages.

* cited by examiner

AVAILABLE NETWORK BANDWIDTH ESTIMATION USING A ONE-WAY-DELAY NOISE FILTER WITH BUMP DETECTION

DESCRIPTION OF RELATED ART

Bandwidth measurement is an important part of any network traffic engineering solution, including those for SDWAN solutions. In order to properly route and load-balance traffic on a network, it is useful to know how much bandwidth is available on the network.

In a closed system, it is possible to collect direct measurements on each of the network devices on the paths of the traffic. However, in many cases, it is not possible to use direct measurements, for example when the network devices may be in different administrative domains, or where they may be hidden by tunneling or route encapsulation. This is the case for Software Defined Wide Area Networks (SD-WAN), where the SD-WAN gateway tries to direct traffic to the best path over the Internet.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
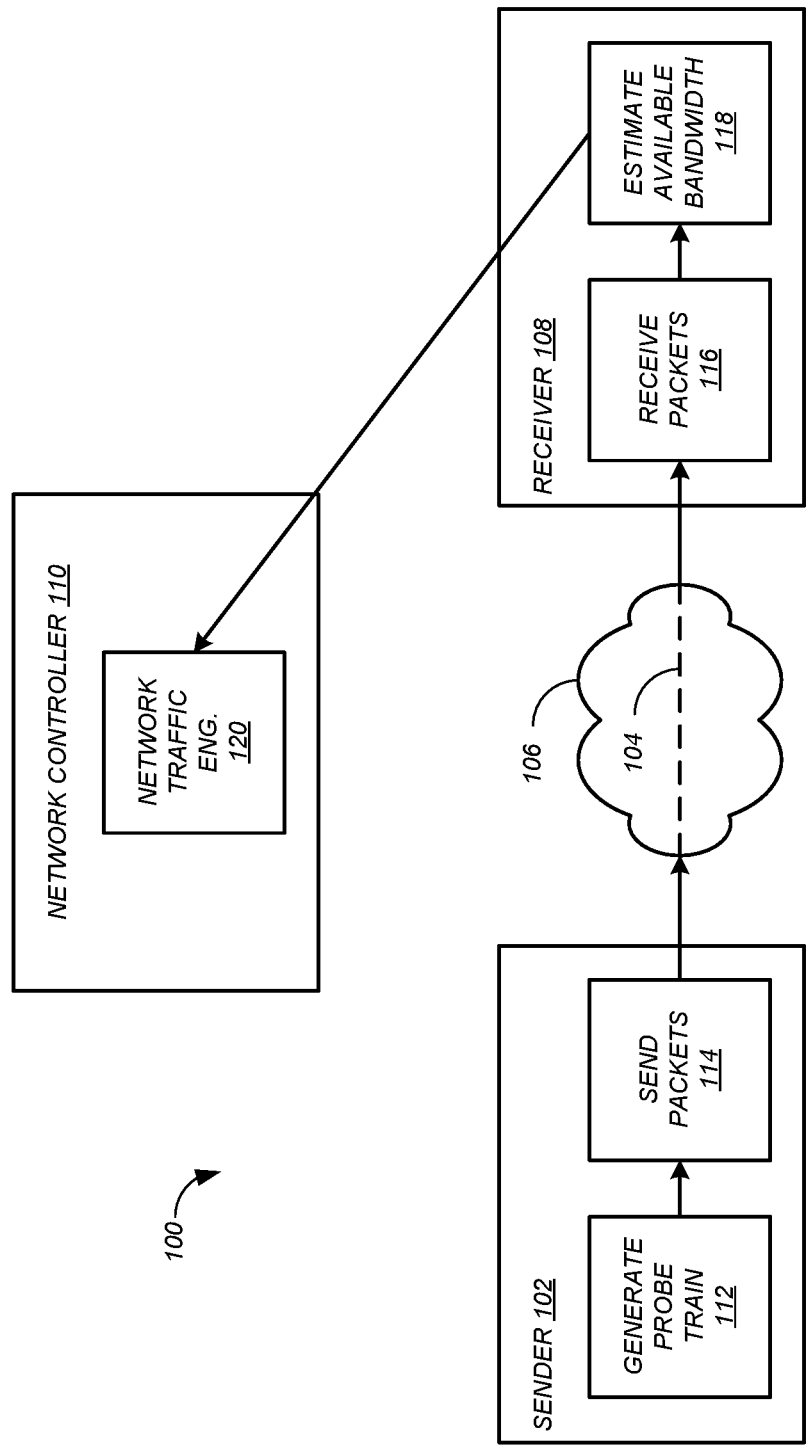
FIG. 1 is a block diagram of a system for estimating available bandwidth using a probe train according to one embodiment.

The figures are not exhaustive and do not limit the present disclosure to the precise form disclosed.

DETAILED DESCRIPTION

Wide area networks (WANs) may exist across multiple domains, whether they be geographic domains, administrative domains, or organizational domains. An administrator of the WAN may not have administrative access to all of the domains that the WAN spans. One example of such a topology is a software defined WAN (SD-WAN), wherein a branch network (e.g. a campus of an enterprise) is connected to a core network (e.g. a headquarters of an enterprise) via one or more secure tunnels through the Internet. While a network administrator for such an SD-WAN may have administrative control over network infrastructure devices (e.g. controllers, switches, routers, gateways, etc.) in the branch network and in the core network, the administrator does not have administrative control over the intervening network infrastructure devices throughout the Internet.

This lack of full administrative control over the intervening Internet links of the WAN makes it impossible to directly measure the performance of network paths. When there is more than one path to transceive data between two devices in a network, performance data for each of those paths can be used to select a preferred path for forwarding such data. This may reduce latency, increase throughput across all network paths, and reduce the likelihood of dropped packets due to network infrastructure devices Referring again to the SD-WAN example, it may be impossible to directly measure the performance of the one or more secure tunnels connecting devices (e.g. user devices, servers, etc) in the branch network with devices in the core network. However, determining which secure tunnel to use may improve network efficiency by reducing the likelihood of saturating one of the tunnels (i.e. sending more data than the tunnel can handle without degraded performance).

When direct measurements are not possible, bandwidth estimation may be performed from two devices that can be controlled and used for measurements. This is usually performed by probing the network path with specially crafted probe packets sent from a device on one end of the path (sender) to a device on the other end of the path (receiver). The receiver end device measures the receive time of the packets and the changes to the packet one-way delay/time pattern to estimate the path characteristics, such as the path capacity, the available bandwidth and/or the bulk transfer capacity. Path capacity is the maximum amount of traffic volume per unit time that can be sent if the network path is idle, i.e. without any competing traffic. Available bandwidth (ABW) is the remaining/residual path capacity, i.e. the capacity not currently used by other traffic. Bulk Transfer Capacity (BTC) is the bandwidth a TCP connection would get if placed on this network path. Latency is the one-way delay (OWD) from the sender to the receiver; and round-trip time (RTT) is the two-way delay between the sender and the receiver.

The primary approach for end-to-end network path estimation is active probing. A device at one end of the Internet path sends special probe packets to a device at the other end of the Internet path. Those packets are used only to estimate bandwidth, and do not carry actual data beyond the data payload required by network path estimation itself.

With active probing, the sender sends a series of specially crafted probe packet patterns. The packet pattern is defined by the estimation technique and designed to trigger specific behaviors from the network elements on the network path. For example, in many cases the packet pattern is a probe train. The packets and interval between packet transmissions are chosen to probe various bandwidths across the packet pattern. The receiver measures the received time of the packets, computes a one-way delay of each packet (e.g., the time taken by a packet to reach from sender device to receiver device), and examines the changes to the packet pattern. The estimation technique uses a simplified network model to convert those measurements into estimates of various network path characteristics.

There are two main classes of bandwidth estimation techniques, those using a probe gap model and those using the probe rate model. For the probe gap model, the assumption is that two closely sent packets will see the gap between them increase in proportion to the load on the most loaded queue along the path, due to queuing delay on that queue. For the probe rate model, the assumption is that when packets are sent at a rate lower than the bottleneck bandwidth, the traffic pattern will be mostly unchanged, whereas when packets are sent at a rate greater than the bandwidth available on the path bottleneck, those packet will suffer extra queuing delay due to congestion.

Figure 3:
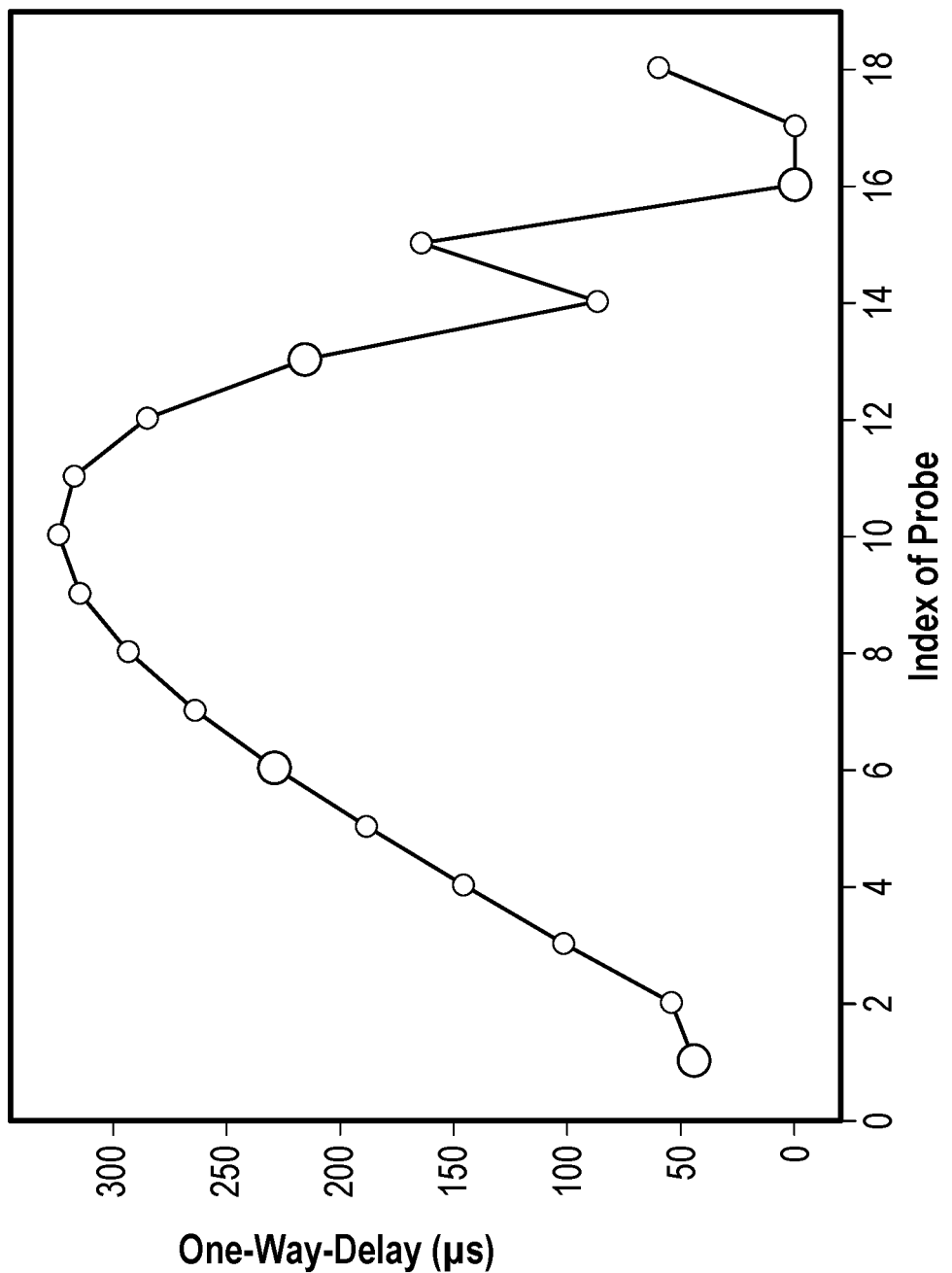
FIG. 3 is a graph of relative one-way delay (OWD)s for a probe train of 18 probes sent over a network path at decreasing rates, that is, at increasing inter-departure time (IDT)s.

One technique for available bandwidth estimation is named PathCos++. The PathCos++ technique is described in the document "A Novel Hybrid Probing Technique for End-to-End Available Bandwidth Estimation" by Lin et al., 35th Annual IEEE Conference on Local Computer Networks, 2010. According to PathCos++, a train of probes is sent at decreasing rates over the path to be measured. A receiver measures the receive probe rate between two points of equal congestion. FIG. 3 is an example of a graph of relative OWDs for a probe train of 18 probes sent over a network path at decreasing rates, that is, at increasing IDTs. As can be seen in FIG. 3, the graph depicts a "Bump." Points of equal congestion are points on opposite sides of the bump having similar OWD measurements.

PathCos++ and some other bandwidth estimation techniques use a Bump Detection Algorithm for selecting those two points of equal congestion. However, the Bump Detection Algorithm is quite sensitive to noise in packet receive timing. In many cases this noise prevents the algorithm from finding the right pair of points, which may lead to large errors in the bandwidth estimates.

FIG. 1 is a block diagram of an example system 100 for estimating available bandwidth using a probe train. The system 100 in this example includes a sender 102 connected by a network path 104 in a network 106 to a receiver 108. The example system 100 also includes a network controller 110. Each of the sender 102 and the receiver 108 may be implemented as a network device, for example such as a switch, a router, a gateway, a server, a client, or the like.

In operation, sender 102 generates a probe train comprising a plurality of packets, at 112, and sends the packets over the network path, at 114. The receiver 108 receives the packets, at 116, and estimates the available bandwidth based on the packets, at 118. The receiver 108 provides the available bandwidth estimate to the network controller 110. The network controller 110 may utilize the available bandwidth estimate to perform network traffic engineering and the like, at 120.

Figure 2:
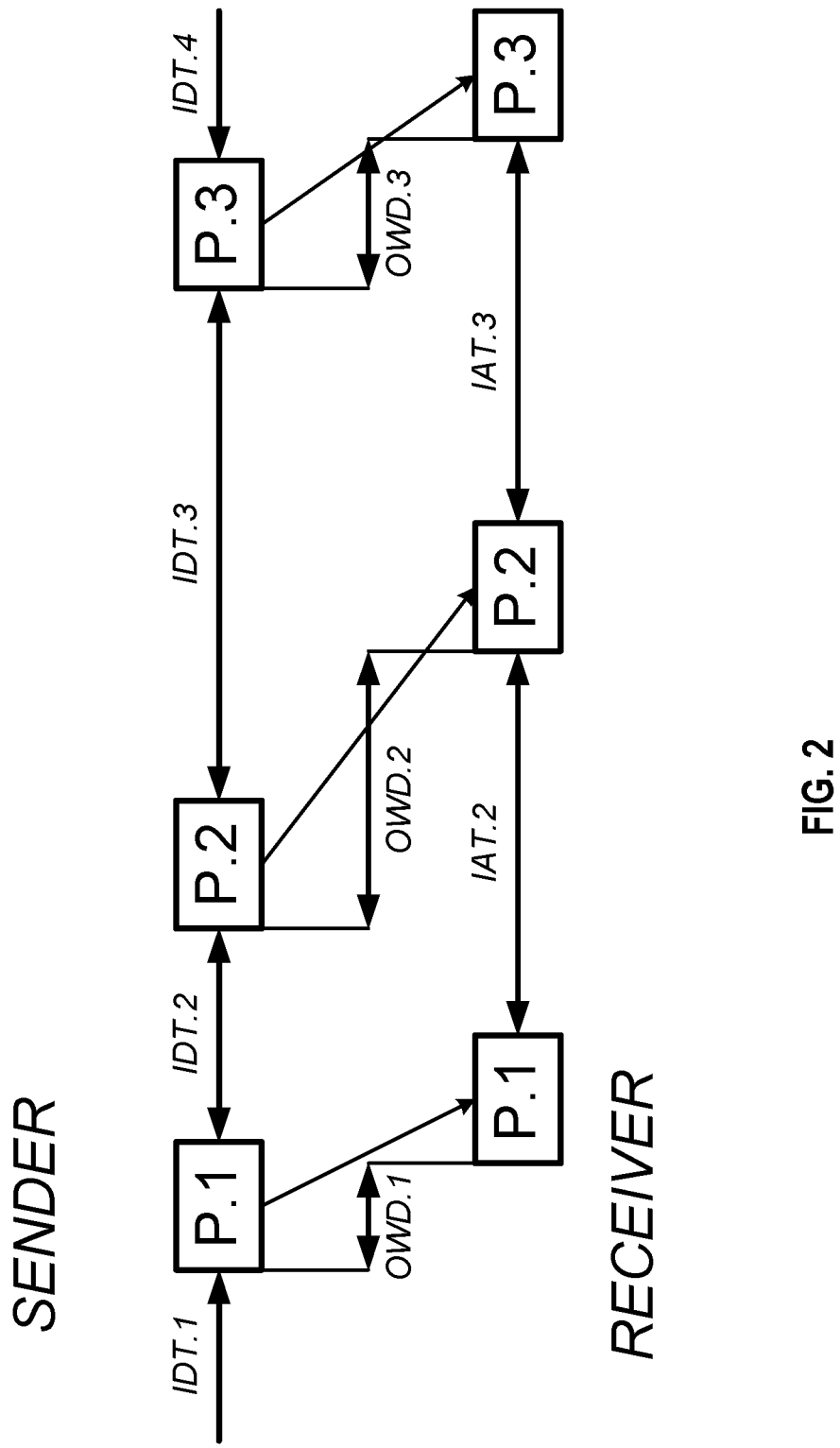
FIG. 2 shows timing characteristics of a probe train according to one embodiment.

FIG. 2 shows timing characteristics of a probe train according to one embodiment. Three packets are shown: P.1, P.2, and P.3. These three packets are shown both in the upper part of FIG. 1, when departing the sender, and in the lower part of the diagram, when arriving at the receiver. FIG. 2 illustrates Inter Departure Time (IDT), Inter Arrival Time (IAT), and One Way Delay (OWD). The IDT of a packet is the amount of time between sending the packet and sending the previous packet. The IDT can be computed from the desired probing rate as IDT=Packet-Size/Probed-Rate. The sender is rarely totally accurate in sending packets, so the actual IDT of a packet may differ from the desired/theoretical IDT. The disclosed technology in various embodiments works using both the desired IDT and the actual IDT, but generally provides better results with the actual IDT. The Inter Arrival Time (IAT) of a packet is the amount of time between receiving the packet and receiving the previous packet.

The OWD of a packet is governed mostly by the propagation delay of the network path, the transmission time of the slowest link of the path, and the accumulated queuing delay in all the network elements in the path. For each packet i, the OWD can be computed as:

$$OWD(i) = pd + st(\text{size}) + \text{sum}(qd(e,i))$$

with:
pd → total propagation delay;
st(size) → slowest transmission time for this packet size; and
qd(e,i) → queuing delay at element e for packet i.

These network path estimation techniques may assume a fairly simple queuing model where qd(e,i) is a function of the congestion at element e when packet i arrives.

To measure packet departure time and arrival time the sender and receiver use different clocks, which may not be perfectly synchronized. Therefore, it may be difficult to accurately measure the OWD of packets. Fortunately, in most cases it is not the absolute OWD of a packet that matters, but rather the difference between the OWDs of different packets. Over the short time of a probe train, clock drift is negligible, and therefore the difference between clocks can be within an acceptable range of accuracy. The disclosed technology may use this relative OWD for packet measurement. For each packet, the relative OWD of a packet may be the difference between the OWD of that packet and a per probe train fixed constant. For example, it may be the difference between the OWD of that packet and the OWD of the first packet of the probe train. This relative OWD estimates the extra queuing delay of a packet relative to another packet, and may be a positive or a negative value.

If there are no packet losses and no packet reordering, packets are sent and received in the same order. In this case, the IAT, IDT and OWD of each packet are directly related. If OWDp is the One Way Delay of the previous packet, and OWDc the One Way Delay of the current packet, the IAT can be given by:

$$IAT = OWDc - OWDp + IDT$$

FIG. 3 is an example of a graph of relative OWDs for a probe train of 18 probes sent over a network path at decreasing rates, that is, at increasing IDTs. In some embodiments, each probe includes only one probe packet. In other embodiments, as discussed below, each probe includes multiple probe packets.

In FIG. 3 it can be seen that the graph forms a "bump" and Bump Detection Algorithms (BDA) can be used to locate the bump. The top of the bump represents the maximum relative OWD and indicates the bottleneck bandwidth. To compute the bottleneck bandwidth a pair of packets is required. The goal of BDA is to select a representative pair of packets with similar OWD on both sides of a big bump in OWD. Because the pair of packets is used to estimate the available bandwidth, the quality of the available bandwidth estimate is only as good as the selection of those packets.

The probe train is sent at a decreasing rate. Therefore the probe train first creates congestion of the network path (being sent at a rate higher than the bottleneck), and then decongests that network path (being sent at a rate lower than the bottleneck). This means that across the probe train, OWD of packets increases initially due to congestion, and then decreases due to decongestion. The peak of the bump in OWD represents the time of maximum congestion. Packets with similar OWD should have experienced similar congestion (similar amount of queuing).

The BDA preferably selects packets parts of the same congestion period. If they are not part of the same congestion period, there may be some idle time between those two packets, and in this case not much can be said apart from the fact that the rate of packet probe is lower than the available bandwidth. If two packets are part of the same congestion period and have similar congestion, the overall rate of probes between these two packets have a fairly neutral contribution to congestion, which means the overall rate of probes is close to the available bandwidth.

To avoid issues with the granularity of OWD, and to have a better averaging over time, the BDA may be implemented to locate a pair of packets as far apart as possible. Accordingly, it may look for packets with the maximum time between them in the probe train. However, the network path must remain congested between those two packets to satisfy the model requirement, which means that the two packets must be part of the OWD bump. In practice, the BDA tries to find two packets around the base of the OWD bump.

An increase in OWD in the probe train in theory indicates increased congestion, however in reality OWD measurements are very noisy. This noise is due to the imperfection and non-ideal behavior of the various network elements and other packet scheduling constraints.

Such noise in the OWD directly impacts the BDA algorithm. Noisy OWD values may lead the BDA to select two packets with similar OWD that in reality did not experience the same level of congestion, or packets that are not part of the same congested period. This leads to improper available bandwidth estimates.

The BDA of PathCos++ may be challenged by typical OWDs measured on a common network path. For example, on an idle Ethernet link, which is the best-case scenario, the BDA has a fairly high error rate. Also, PathCos++ often underestimates the available bandwidth, and in some instances the pair of packets selected are not part of the same congested period.

A large source of measurement noise is packet batching. Packet batching happens when in a queue, packets are processed as a group, instead of individually. This packet batching may impact drastically the OWD of the packets. The earlier packets of the group have to wait for the group to be processed and see their OWD artificially inflated, whereas the last packet of the group waits less time and so has a lower OWD.

The authors of PathChirp, a very popular bandwidth estimation technique, identified a common source of packet batching, interrupt coalescence in the receiver Network Interface Card (NIC). Their solution employs multiple packets per probe. A probe train is composed of a number of probes, each probe testing a specific rate on the network path. When batching mitigation is enabled, the sender sends multiple packet for each probe, instead of a single packet per probe. All packets of a probe are sent at the same rate, and therefore have the same IDT. The receiver filters the packets, and for each probe selects only a single packet, the packet that is estimated to have suffered the least from packet batching. The BDA is run only on the selected packets, not on all received packets.

Figure 4:
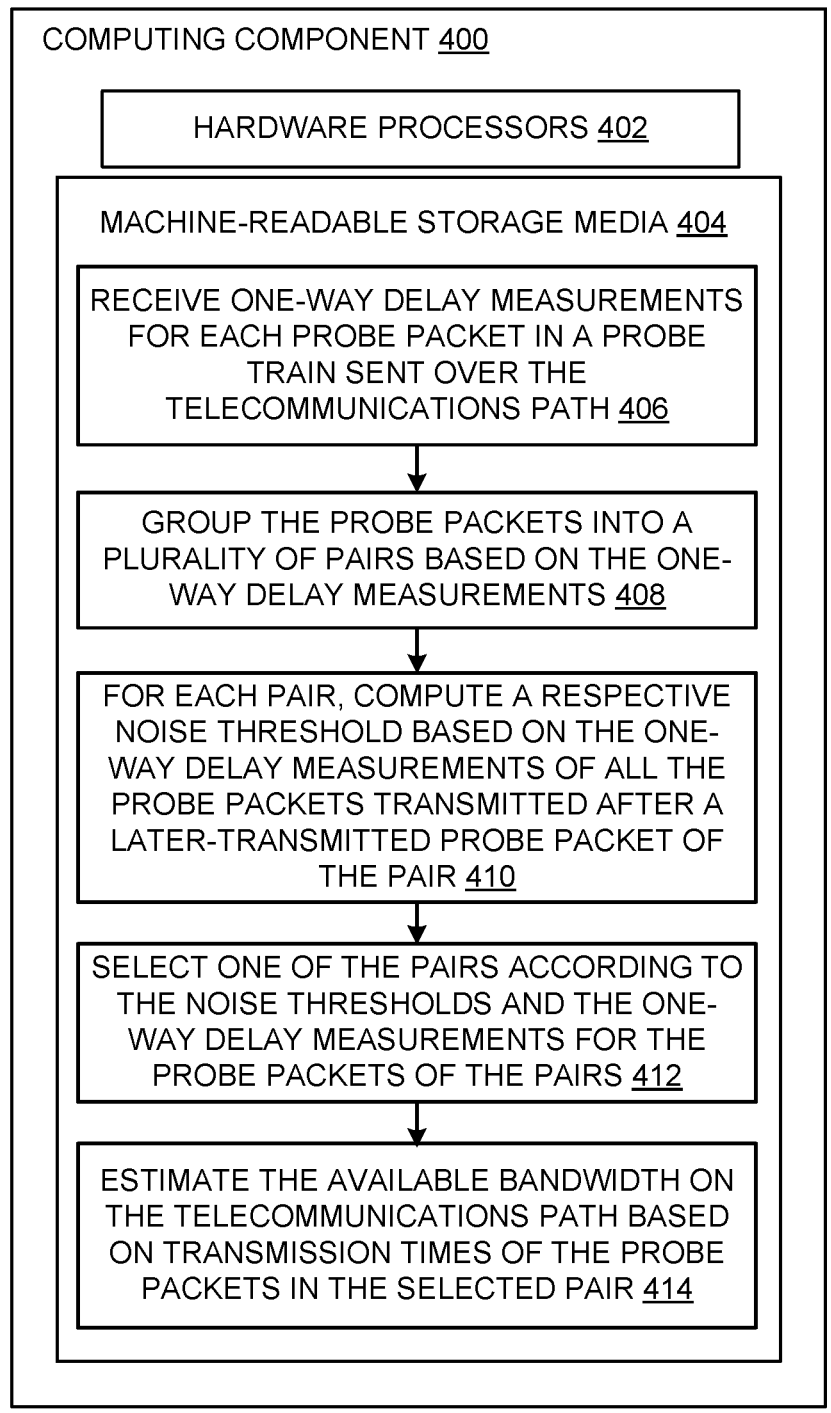
FIG. 4 is a block diagram of an example computing component or device for estimating available bandwidth on a network path in accordance with one embodiment.

FIG. 4 is a block diagram of an example computing component or device 400 for estimating available bandwidth on a network path in accordance with one embodiment. Computing component 400 may be, for example, a server computer, a controller, or any other similar computing component capable of processing data. In the example implementation of FIG. 4, the computing component 400 includes a hardware processor, 402, and machine-readable storage medium, 404. In some embodiments, computing component 400 may be an embodiment of the sender 102, the receiver 108, or the network controller 110 of FIG. 1, or some combination thereof.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414, to control processes or operations for estimating available bandwidth on the network path. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to receive one-way delay measurements for each probe packet in a probe train sent over the telecommunications path. The OWD measurements may be calculated by any method. For example, the OWD of each packet in a probe train may be measured relative to the OWD of the first packet in the probe train. This approach may reduce the effect of synchronization errors between the sending and receiving clocks, and may also reduce the bit lengths of the OWD measurements.

The disclosed technology may include a novel technique to mitigate OWD noise in the Bump Detection Algorithm for available bandwidth estimation. The improved BDA prefers a pair of packets that has a OWD larger than the OWD noise after the bump.

OWD noise is typically not the same across the probe train. OWD noise tends to be greater when the network path is not congested, and also tends to be less when the network path is congested. When the network path is congested, scheduling is more predictable and there is less jitter. Moreover, with larger OWD, this noise decreases even more in proportion of the OWD.

Figure 5:
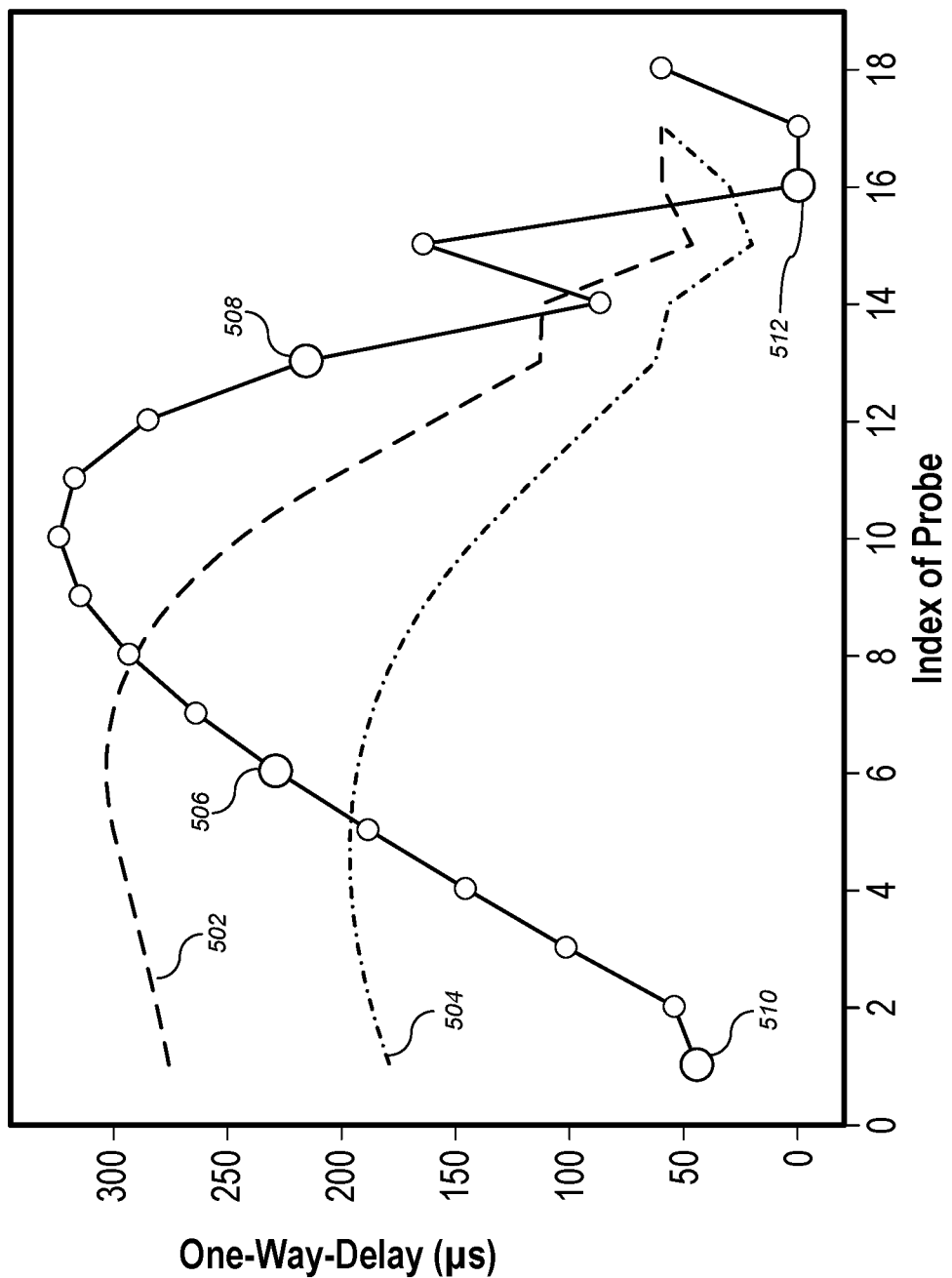
FIG. 5 shows the noise thresholds for the probe train of FIG. 3.

Previous techniques also tend to pick packets too close to the base of the bump, bump i.e. pick the widest pair with similar OWD, and run the risk that those packets might not be in the same congested period, as shown in FIG. 5. In other words, there is an idle gap on the bottleneck between these two packets.

The disclosed technology prefers pairs of packets higher than the base of the bump to avoid OWD noise. We use a statistical measure of the uncongested OWD after the bump as a OWD threshold, and we prefer pairs of packets having a OWD greater than that threshold.

Hardware processor 402 may execute instruction 408 to group the probe packets into a plurality of pairs based on the one-way delay measurements. The disclosed technology selects a number of candidate pairs of packets after packet batching filtering and other validity filtering, i.e. packets that are eligible to perform bandwidth estimation. Each packet pair has a first packet and a second packet, mostly selected based on their OWD, with the first packet transmitted before the second packet. For example, two of the probe packets may be grouped into a pair when the two of the probe packets have similar one-way delay measurements, and a probe packet having a maximum one-way delay measurement for the probe train was transmitted between the two of the probe packets.

Hardware processor 402 may execute instruction 410 to compute, for each pair, a respective noise threshold based on the one-way delay measurements of all the probe packets transmitted after the later-transmitted probe packet of the pair. For each pair of packets, the system computes a statistic using the OWD of all packets of the probe train after the end packet of the pair (the second packet, in decongestion). These packets follow the congestion, and so are representative of the OWD noise. In some embodiments, the system computes both the average (mean) and the mean absolute deviation (MAD) of the OWD of those trailing packets, and combine both to define an OWD threshold. Our current OWD threshold is the average plus 1.5 time the deviation, which is approximately the 85% percentile of the OWD noise. Other OWD thresholds may be used. In some embodiments, computing a respective noise threshold for a pair includes computing a mean average distance of the one-way delay measurements of all the probe packets transmitted after the later-transmitted probe packet of the pair. In some embodiments, computing a respective noise threshold for a pair includes computing a standard deviation of the one-way delay measurements of all the probe packets transmitted after the later-transmitted probe packet of the pair. In some embodiments, computing a respective noise threshold for a pair includes computing a cumulative distribution function of the one-way delay measurements of all the probe packets transmitted after the later-transmitted probe packet of the pair. FIG. 5 shows the noise thresholds 502 for the probe train of FIG. 3. The OWD averages 504 are also shown, for reference.

At this point, the original BDA may filter out candidate packet pairs that don't meet the bump filter (the bump filter looks at the bump's highest OWD, the bump height and width), and if there are any remaining pairs, picks the widest one. Hardware processor 402 may execute instruction 412 to select one of the pairs according to the noise thresholds 502 and the one-way delay measurements for the probe packets of the pairs. In some embodiments, the pair having the lowest one-way delay measurement that exceeds the respective noise threshold 502 is selected. If there are pairs of packets that meet the bump filter and for which the OWD of the end packet is higher than the OWD threshold, the widest packet pair is selected. Otherwise, if there are pairs of packets that meet the bump filter, but none have the OWD of the end packet higher than the OWD threshold, the packet pair with the highest OWD is selected.

In the example of FIG. 5, pair 506, 508 is selected. For comparison, previous techniques would choose pair 510, 512. Note that pair probe 512 is not part of the bump, so probes 510 and 512 are not part of the same congestion period, and would therefore produce an inaccurate bandwidth estimate.

Hardware processor 402 may execute instruction 414 to estimate the available bandwidth on the telecommunications path based on transmission times of the probe packets in the selected pair 506, 508. Many such bandwidth estimation techniques exist, such as, for example, the original PathCos++ method. One example is to measure the receive rate of probe packets between the two packets of the selected pair.

The bandwidth estimate for the telecommunications path may be used to perform network traffic engineering for the network comprising the telecommunications path. The network traffic engineering may include routing packets through the network, performing load balancing for the network, and the like. The bandwidth estimate for the telecommunications path may be used to select a transmission rate for transport control protocol (TCP) packets to be transmitted over the telecommunications path. The bandwidth estimate for the telecommunications path may be used to select a video encoding rate for video to be transmitted over the telecommunications path. The bandwidth estimate for the telecommunications path may be reported to a user of the telecommunications path.

The main benefit of the disclosed technology is its performance. It improves the selection of packet pairs and leads to much better available bandwidth estimates. Another benefit is that it's a simple modification of the Bump Detection Algorithm (BDA) used by many of the best techniques to measure available bandwidth.

Figure 6:
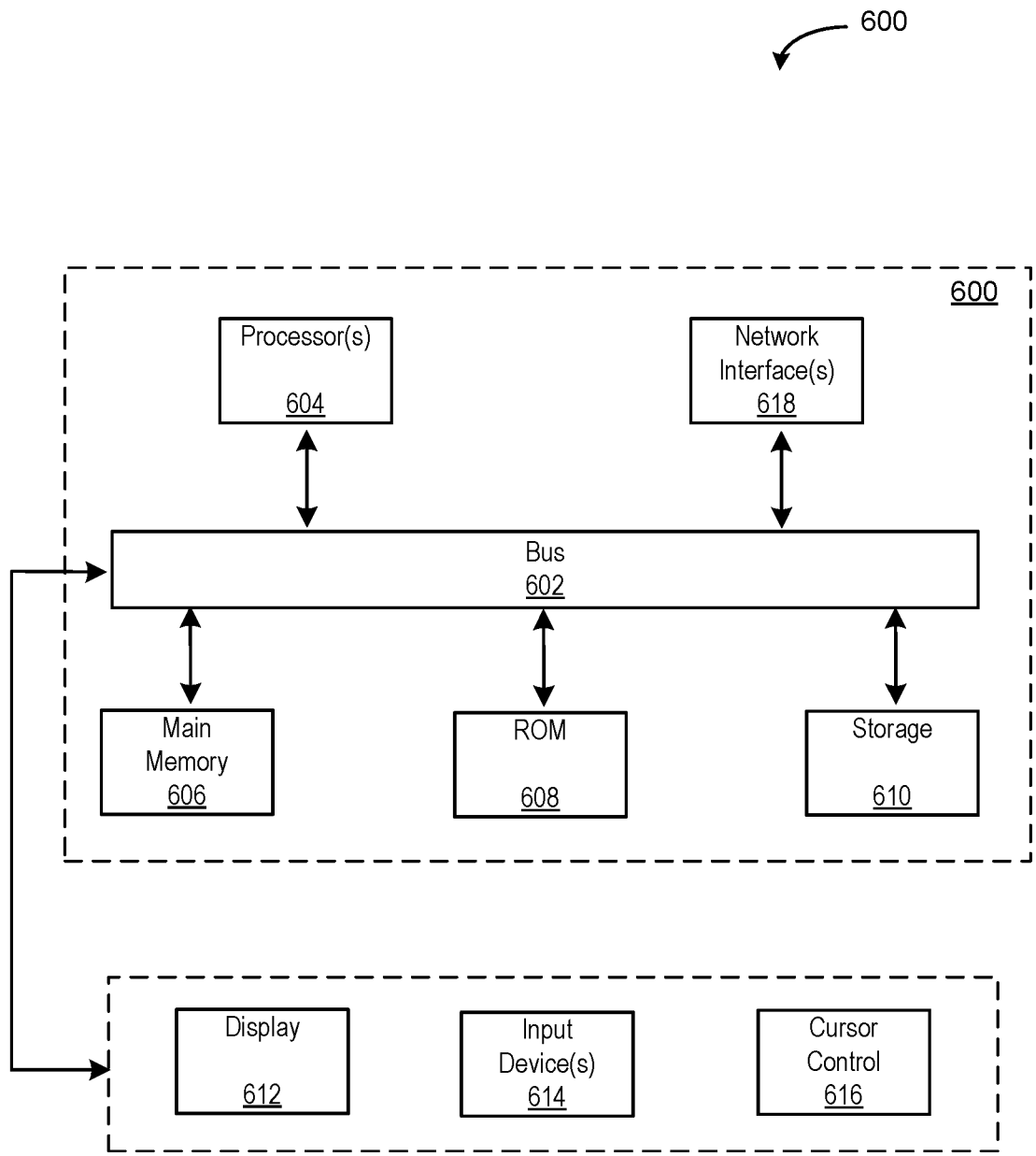
FIG. 6 depicts a block diagram of an example computer system in which various of the embodiments described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Software Defined Networking (SDN) is an approach for managing networks. SDN defines APIs which allow decoupling the datapath (packet forwarding) and the control plane (protocol intelligence) of network elements. In other words, a network controller, an entity outside the network element, can have fine grained control and visibility over that network element. This can be used by the network controller to change the policy of network elements dynamically, or to centralize the control plane and decision making of the network.

The SDN approach is also very well suited for network traffic engineering. The SDN APIs usually define both measurement and control, and thus enables the network controller to measure the network and dictate a distribution of traffic.

One of the limitations of SDN is that it assumes a tight coupling between the network controller and the network elements. This can work well at small to medium scale, but usually won't scale to larger networks. Its efficiency is also diminished if the network between the network controller and network elements has limited performance (e.g., low bandwidth or high latency). Moreover, the SDN approach usually does not allow crossing administrative domain boundaries, because different entities can only trust controlled and limited interactions between each other.

Software Defined WAN (SD-WAN) technology proposes to use SDN principles to manage WAN connectivity. This can offer centralized visibility and control over the WAN connectivity of the organization. Another goal of SD-WAN is to reduce the cost of WAN connectivity.

The way SD-WAN reduces cost is to replace those dedicated WAN links by tunnels over the Internet. In this case, each branch and location has multiple WAN links connected to the Internet, usually using inexpensive consumer WAN technologies such as DSL, CableModem or Wireless 3G. A special SD-WAN gateway in each branch and location creates private tunnels (VPN tunnels) to connect securely to other branches and locations over the WAN links and the Internet.

Replacing the dedicated WAN links enables reduction in the cost of WAN connectivity. However, consumer WAN technology and the Internet do not provide the same high availability and quality of service guarantees as legacy dedicated WAN links.

The common way SD-WAN solutions deal with this issue is for the SD-WAN gateway in each branch and location to have multiple WAN links to the Internet. The SD-WAN gateway creates parallel tunnels over the Internet using each WAN link, implements tunnel handoff, and uses network traffic engineering to direct traffic to the most appropriate network tunnel with the goal of optimally using the available network capacity. For example, if the SD-WAN gateway detects that a WAN link is down, it will direct traffic away from that WAN link to a tunnel not using that particular WAN link.

The SD-WAN gateway can perform more advanced traffic engineering. For example, it can monitor the performance of each tunnel, in terms of latency, available bandwidth and throughput, and then load balance traffic, or map each traffic type to the most appropriate tunnel for that traffic.

Network traffic engineering typically looks at the properties of the network traffic and the network elements and their connectivity to both help design the network and direct traffic onto different paths in that network. Proper traffic engineering helps to increase the network performance and lower its cost.

One of the simplest forms of network traffic engineering is to add a backup link to the network to be used in case of failure of the primary link. Multi-rooted trees, such as fat trees, are topologies that offer many such parallel paths. They have been extensively studied, and many approaches have been proposed to load balance packets on such topologies. The Internet is a more complex network that is split across many entities and administrative domains, and therefore traffic engineering for the Internet is much more complex. On the Internet, each entity usually does fairly advanced traffic engineering within its own domain, and cross domain interactions are typically managed through Border Gateway Protocol (BGP) routing, which allows only for fairly coarse traffic engineering.

Most techniques for traffic engineering are composed of three parts. The first part is measurement, where some attributes of the traffic and/or network are measured. The second part is optimization, where an optimal distribution of traffic is computed. The third part is control, where the network is reconfigured to implement the desired distribution of traffic.

A key component of such traffic engineering is a way to measure the performance of each network tunnel. Each tunnel defines a network path across the Internet. The tunneled packets are processed by a number of network elements along the network path. The network path used by a tunnel (outside the tunnel) and the network path inside a tunnel are logically different (they have different end point addresses). However, those two network paths go through the same network elements, and in most cases have almost the same performance, and strongly correlated performance characteristics. Therefore, measuring the performance of an network tunnel can be done by measuring the network path outside or inside the tunnel. For purposes of the disclosed technology, they are considered the same network path.

What is claimed is:

1. A method comprising:
    receiving, at a system comprising a hardware processor, one-way delay measurements for probe packets in a probe train sent over a network path;
    grouping, by the system, the probe packets into a plurality of pairs of probe packets based on the one-way delay measurements that form a bump;
    for each respective pair of the plurality of pairs, computing, by the system, a respective noise threshold based on one-way delay measurements of probe packets transmitted after a later-transmitted probe packet of the respective pair, the computing producing noise thresholds for the plurality of pairs;
    selecting, by the system, a selected pair of the plurality of pairs according to a comparison of the one-way delay measurements for the probe packets of the plurality of pairs to the noise thresholds; and
    estimating, by the system, an available bandwidth on the network path based on transmission times of the probe packets in the selected pair.

2. The method of claim 1, wherein the grouping of the probe packets into the plurality of pairs comprises:
    grouping two of the probe packets into a pair based on positions of one-way delay measurements of the two of the probe packets on the bump, wherein a peak of the bump represents a maximum one-way delay measurement of a given probe packet for the probe train, wherein the given probe packet was transmitted between the two of the probe packets, and
    wherein the selecting of the selected pair is performed using a bump detection process.

3. The method of claim 1, wherein computing a first noise threshold for a first pair of the plurality of pairs comprises:
    computing an average of one-way delay measurements of probe packets transmitted after a later-transmitted probe packet of the first pair; and
    computing a standard deviation of the one-way delay measurements of the probe packets transmitted after the later-transmitted probe packet of the first pair.

4. The method of claim 1, wherein the selecting of the selected pair of the plurality of pairs of probe packets:
    selecting a pair of the plurality of pairs of probe packets having a lowest one-way delay measurement that exceeds a respective noise threshold of the noise thresholds.

5. The method of claim 1, further comprising:
    performing network traffic engineering for a network comprising the network path based on the estimated available bandwidth.

6. The method of claim 5, wherein performing the network traffic engineering for the network comprises one or more of:
    routing packets through the network; or
    performing load balancing for the network.

7. A system comprising:
    a hardware processor; and
    a non-transitory machine-readable storage medium comprising instructions executable on the hardware processor to:
        receive one-way delay measurements for probe packets in a probe train sent over a network path;
        group the probe packets into a plurality of pairs of probe packets based on the one-way delay measurements that form a bump;
        for each respective pair of the plurality of pairs, compute a respective noise threshold based on one-way delay measurements of probe packets transmitted after a later-transmitted probe packet of the respective pair, the computing producing noise thresholds for the plurality of pairs;
        select, using a bump detection process, a selected pair of the plurality of pairs according to a comparison of the one-way delay measurements for the probe packets of the plurality of pairs to the noise thresholds; and
        estimate an available bandwidth on the network path based on transmission times of the probe packets in the selected pair.

8. The system of claim 7, wherein the grouping of the probe packets into the plurality of pairs comprises:
    grouping two of the probe packets into a pair based on positions of one-way delay measurements of the two of the probe packets on the bump, wherein a peak of the bump represents a maximum one-way delay measurement of a given probe packet for the probe train, wherein the given probe packet was transmitted between the two of the probe packets, and
    wherein the bump detection process detects the one-way delay measurements of the two of the probe packets on different sides of the bump relative to the peak of the bump.

9. The system of claim 7, wherein computing a first noise threshold for a first pair of the plurality of pairs of probe packets comprises one or more of:
    computing an average of one-way delay measurements of probe packets transmitted after a later-transmitted probe packet of the first pair;
    computing a mean average distance to the average of the one-way delay measurements of the probe packets transmitted after the later-transmitted probe packet of the first pair;
    computing a standard deviation of the one-way delay measurements of the probe packets transmitted after the later-transmitted probe packet of the first pair; or
    computing a cumulative distribution function of the one-way delay measurements of the probe packets transmitted after the later-transmitted probe packet of the first pair.

10. The system of claim 7, wherein the selecting of the selected pair of the plurality of pairs of probe packets comprises:
    selecting a pair of the plurality of pairs of probe packets having a lowest one-way delay measurement that exceeds a respective noise threshold of the noise thresholds.

11. The system of claim 7, wherein the bump detection process detects a peak of the bump and the selected pair comprises probe packets associated with one-way delay measurements that are on different sides of the bump relative to the peak of the bump.

12. The system of claim 7, wherein the instructions are executable on the hardware processor to perform network traffic engineering for a network based on the estimated available bandwidth, the network traffic engineering comprising:
    routing packets through the network; or
    performing load balancing for the network.

13. The system of claim 7, wherein the instructions are executable on the hardware processor to:
    select a transmission rate for transport control protocol (TCP) packets to be transmitted over the network path based on the estimated available bandwidth; or select a video encoding rate for video to be transmitted over the network path based on the estimated available bandwidth.

14. A non-transitory machine-readable storage medium comprising instructions that upon execution cause a system to:
- receive one-way delay measurements for probe packets in a probe train sent over a network path;
- group the probe packets into a plurality of pairs of probe packets based on the one-way delay measurements that form a bump;
- for each respective pair of the plurality of pairs, compute a respective noise threshold based on one-way delay measurements of probe packets transmitted after a later-transmitted probe packet of the respective pair, the computing producing noise thresholds for the plurality of pairs;
- select, using a bump detection process, a selected pair of the plurality of pairs according to a comparison the one-way delay measurements for the probe packets of the plurality of pairs to the noise thresholds; and
- estimate an available bandwidth on the network path based on transmission times of the probe packets in the selected pair.

15. The non-transitory machine-readable storage medium of claim 14, wherein the grouping of the probe packets into the plurality of pairs comprises:
- grouping two of the probe packets into a pair based on positions of one-way delay measurements of the two of the probe packets on the bump, wherein a peak of the bump represents a maximum one-way delay measurement of a given probe packet for the probe train, wherein the given probe packet was transmitted between the two of the probe packets, and
- wherein the bump detection process detects the one-way delay measurements of the two of the probe packets on different sides of the bump relative to the peak of the bump.

16. The non-transitory machine-readable storage medium of claim 14, wherein computing a first noise threshold for a first pair of the plurality of pairs of probe packets comprises:
- computing an average of one-way delay measurements of probe packets transmitted after a later-transmitted probe packet of the first pair; or
- computing a mean average distance to the average of the one-way delay measurements of the probe packets transmitted after the later-transmitted probe packet of the first pair.

17. The non-transitory machine-readable storage medium of claim 14, wherein the selecting of the selected pair of the plurality of pairs of probe packets comprises:
- selecting a pair of the plurality of pairs of probe packets having a lowest one-way delay measurement that exceeds a respective noise threshold of the noise thresholds.

18. The non-transitory machine-readable storage medium of claim 14, wherein the bump detection process detects a peak of the bump and the selected pair comprises probe packets associated with one-way delay measurements that are on different sides of the bump relative to the peak of the bump.

19. The non-transitory machine-readable storage medium of claim 18, wherein another pair of the plurality of pairs of probe packets is associated with one-way delay measurements that do not exceed a respective noise threshold of the noise thresholds.

20. The non-transitory machine-readable storage medium of claim 14, wherein the instructions upon execution cause the system to:
- select a transmission rate for transport control protocol (TCP) packets to be transmitted over the network path based on the estimated available bandwidth; or
- select a video encoding rate for video to be transmitted over the network path based on the estimated available bandwidth.

* * * * *